(12) United States Patent
Keikhaee et al.

(10) Patent No.: US 11,554,555 B2
(45) Date of Patent: Jan. 17, 2023

(54) APPARATUS FOR SEALING THE TOP OF A PACKAGE FOR A FOOD PRODUCT AND SYSTEM FOR FORMING AND FILLING A FOOD PACKAGE

(71) Applicant: Tetra Laval Holdings & Finance S.A., Pully (CH)

(72) Inventors: Manoochehr Keikhaee, Bunkeflostrand (SE); Jörgen Riis Mörk, Vipperöd (DK); Dennis Lundmark, Lomma (SE); Lars Regner, Falsterbo (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 82 days.

(21) Appl. No.: 16/616,378

(22) PCT Filed: May 29, 2018

(86) PCT No.: PCT/EP2018/064106
§ 371 (c)(1),
(2) Date: Nov. 22, 2019

(87) PCT Pub. No.: WO2018/219970
PCT Pub. Date: Dec. 6, 2018

(65) Prior Publication Data
US 2020/0101678 A1    Apr. 2, 2020

(30) Foreign Application Priority Data

May 30, 2017    (EP) ..................................... 17173429

(51) Int. Cl.
*B29C 65/00*    (2006.01)
*B29C 65/78*    (2006.01)
*B65B 51/14*    (2006.01)

(52) U.S. Cl.
CPC .... *B29C 66/43122* (2013.01); *B29C 65/7802* (2013.01); *B29C 66/0342* (2013.01);
(Continued)

(58) Field of Classification Search
CPC .......... B29C 66/43122; B29C 65/7802; B29C 66/0342; B29C 66/1122; B29C 66/81419;
(Continued)

(56) References Cited

U.S. PATENT DOCUMENTS 2,899,875 A    8/1959  Leasure
3,408,242 A    10/1968 Rochla
(Continued)

FOREIGN PATENT DOCUMENTS

CH    676958 A5    3/1991
CN    1688483      10/2005
(Continued)

OTHER PUBLICATIONS

International Search Report and Written Opinion of the International Searching Authority for International Application No. PCT/EP2018/064106, dated Jun. 18, 2018, in 11 pages.
(Continued)

*Primary Examiner* — Hemant Desai
*Assistant Examiner* — Mobeen Ahmed
(74) *Attorney, Agent, or Firm* — Knobbe, Martens, Olson & Bear, LLP

(57) ABSTRACT

An apparatus for sealing the top of a package for a food product is disclosed. The apparatus comprises a pair of oppositely disposed first and second sealing jaws configured for reversibly engaging each other over the top of the package, at least one wedge on the first sealing jaw configured for contacting a first top portion of the package to form a first gable panel, a key on the second sealing jaw configured for contacting a second top portion of the package to
(Continued)

form a second gable panel, at least one lug on the key configured for reducing skewing of the package prior to sealing, and a rubber dolly on either the first or the second sealing jaw, the rubber dolly and the opposing sealing jaw being configured to form and seal a fin between the rubber dolly and the opposing sealing jaw thereby sealing the top of the package. A system for forming, filling, and sealing a package containing a food product comprising the apparatus is also disclosed.

17 Claims, 7 Drawing Sheets

(52) U.S. Cl.
CPC .... *B29C 66/1122* (2013.01); *B29C 66/81419* (2013.01); *B29C 66/81457* (2013.01); *B29C 66/8242* (2013.01); *B29C 66/83221* (2013.01); *B29C 66/849* (2013.01); *B65B 51/144* (2013.01)

(58) Field of Classification Search
CPC .......... B29C 66/81457; B29C 66/8242; B29C 66/83221; B29C 66/849; B29C 65/02; B29C 66/8167; B29C 65/18; B65B 51/144
USPC .. 53/565, 373.7, 374.3, 374.5, 374.6, 374.8, 53/374.9
See application file for complete search history.

(56) References Cited

U.S. PATENT DOCUMENTS

| | | |
|---|---|---|
| 3,466,841 A | 9/1969 | Rausing |
| 3,580,788 A | 5/1971 | Gustafson |
| 3,721,534 A | 3/1973 | Kubick |
| 3,808,074 A | 4/1974 | Smith et al. |
| 3,854,874 A | 12/1974 | Loliger et al. |
| 3,864,186 A | 2/1975 | Balla |
| 3,884,746 A | 5/1975 | Loliger et al. |
| 3,890,125 A | 6/1975 | Schoeck |
| 4,169,004 A | 9/1979 | Kock et al. |
| 4,506,125 A | 3/1985 | Smets |
| 4,704,509 A | 11/1987 | Hilmersson |
| 4,721,242 A | 1/1988 | Reil |
| 4,757,175 A | 7/1988 | Mohr et al. |
| 4,776,980 A | 10/1988 | Ruffini |
| 4,784,697 A | 11/1988 | Bordini |
| 4,808,326 A | 2/1989 | Tanino et al. |
| 4,809,485 A | 3/1989 | Nielsen |
| 5,044,140 A | 9/1991 | Iwano |
| 5,200,587 A | 4/1993 | Fang |
| 5,250,140 A | 10/1993 | Hayashi et al. |
| 5,260,535 A | 11/1993 | Holmström et al. |
| 5,286,941 A | 2/1994 | Bel |
| 5,418,069 A | 5/1995 | Learman |
| 5,418,811 A | 5/1995 | Ruffini et al. |
| 5,518,578 A * | 5/1996 | Persells ............... B65B 7/18 53/DIG. 2 |
| 5,588,019 A | 12/1996 | Ruffini et al. |
| 5,714,033 A | 2/1998 | Hayashi et al. |
| 5,889,263 A | 3/1999 | Andersson |
| 5,968,399 A | 10/1999 | Selberg |
| 6,012,267 A * | 1/2000 | Katsumata ............. B65B 55/02 53/425 |
| 6,167,681 B1 * | 1/2001 | Yano ................. B29C 66/81264 53/374.6 |
| 6,216,420 B1 * | 4/2001 | Mazzetto .......... B29C 66/83543 53/375.9 |
| 6,430,899 B1 * | 8/2002 | Cicha ................... B65B 51/144 493/183 |
| 6,503,963 B2 | 1/2003 | Toyoda et al. |
| 6,588,174 B2 | 7/2003 | Yamamoto |
| 6,837,025 B2 | 1/2005 | Kume |
| 7,002,117 B2 | 2/2006 | Thomasset |
| 7,003,934 B1 | 2/2006 | Yano |
| 7,827,768 B2 | 11/2010 | Rosberg et al. |
| 8,572,936 B2 | 11/2013 | Mancin et al. |
| 8,707,661 B2 * | 4/2014 | Kinoshita ......... B29C 66/81429 53/503 |
| 8,707,662 B2 | 4/2014 | Borsari et al. |
| 8,839,597 B2 | 9/2014 | Babini et al. |
| 8,938,938 B2 | 1/2015 | Konno et al. |
| 8,943,786 B2 | 2/2015 | Konno et al. |
| 9,238,515 B2 | 1/2016 | Persson et al. |
| 9,352,869 B2 | 5/2016 | Babini et al. |
| 9,545,751 B2 | 1/2017 | Hull |
| 9,637,260 B2 | 5/2017 | Ghirardello et al. |
| 10,160,162 B2 | 12/2018 | Bierlein et al. |
| 10,350,829 B2 | 7/2019 | Sandberg et al. |
| 10,350,832 B2 | 7/2019 | Karlsson et al. |
| 10,358,243 B2 | 7/2019 | Israelsson et al. |
| 10,414,098 B2 | 9/2019 | Aurand et al. |
| 10,486,839 B2 | 11/2019 | Kogure et al. |
| 10,773,846 B2 | 9/2020 | Gentili et al. |
| 10,875,675 B2 | 12/2020 | Benedetti et al. |
| 10,919,238 B2 | 2/2021 | Lancelotti et al. |
| 10,994,495 B2 * | 5/2021 | Israelsson ............ B65B 9/2049 |
| 2001/0017021 A1 | 8/2001 | Sanfilippo et al. |
| 2001/0047641 A1 * | 12/2001 | Kume ................... B65B 51/303 53/493 |
| 2002/0047009 A1 | 4/2002 | Flugstad et al. |
| 2002/0108705 A1 | 8/2002 | Kume et al. |
| 2003/0116886 A1 | 6/2003 | Nakazawa |
| 2003/0230941 A1 | 12/2003 | Jacobs |
| 2004/0045635 A1 | 3/2004 | Bandyopadhyay et al. |
| 2004/0060928 A1 | 4/2004 | Balla |
| 2004/0182046 A1 | 9/2004 | Babini et al. |
| 2005/0076612 A1 | 4/2005 | Andersson et al. |
| 2005/0241277 A1 * | 11/2005 | Yano ................. B29C 66/81427 53/477 |
| 2006/0124626 A1 | 6/2006 | Kupfer et al. |
| 2006/0154052 A1 | 7/2006 | Waffenschmidt et al. |
| 2007/0251196 A1 * | 11/2007 | Shokri ............. B29C 66/83543 53/500 |
| 2009/0101286 A1 | 4/2009 | Sumeer et al. |
| 2009/0223173 A1 | 9/2009 | Rapparini |
| 2010/0025391 A1 | 2/2010 | Palombini et al. |
| 2010/0155390 A1 | 6/2010 | Hirota |
| 2010/0180545 A1 | 7/2010 | Palmquist et al. |
| 2010/0243155 A1 | 9/2010 | Andrews |
| 2011/0030315 A1 | 2/2011 | Mancin |
| 2011/0094672 A1 | 4/2011 | Wijk et al. |
| 2011/0225929 A1 | 9/2011 | Donati et al. |
| 2013/0119044 A1 * | 5/2013 | Gynnild ................... H05B 3/03 219/385 |
| 2013/0063556 A1 | 10/2013 | Babini et al. |
| 2015/0266603 A1 * | 9/2015 | Aul ................... B29C 66/81431 53/374.2 |
| 2016/0221250 A1 | 8/2016 | Alexandersson et al. |
| 2016/0229118 A1 * | 8/2016 | Palmquist .......... B29C 66/8122 |
| 2016/0297121 A1 | 10/2016 | Palmquist et al. |
| 2017/0182702 A1 * | 6/2017 | Mach ................ B29C 66/73921 |
| 2017/0240309 A1 * | 8/2017 | Rubini ................. B29C 65/368 |
| 2018/0243996 A1 * | 8/2018 | Baltes ............... B29C 66/43122 |
| 2018/0250888 A1 * | 9/2018 | Mach ................. B29C 65/3656 |
| 2018/0272620 A1 * | 9/2018 | Persson ................ B29C 65/087 |
| 2019/0152161 A1 * | 5/2019 | Palmquist ........... B29C 66/1122 |
| 2020/0148406 A1 | 5/2020 | Svard et al. |
| 2021/0245902 A1 | 8/2021 | Donati |
| 2021/0331426 A1 | 10/2021 | Sanibondi et al. |
| 2022/0048657 A1 | 2/2022 | Sanibondi et al. |
| 2022/0127031 A1 * | 4/2022 | Karlsson ........... B29C 66/81427 |

FOREIGN PATENT DOCUMENTS

| | | |
|---|---|---|
| CN | 102181156 | 9/2011 |
| CN | 103501982 | 1/2014 |
| CN | 105073368 | 11/2015 |
| CN | 107406160 | 11/2017 |

(56) References Cited

FOREIGN PATENT DOCUMENTS

| | | |
|---|---|---|
| DE | 19815439 | 10/1999 |
| DE | 10 2015 102860 A1 | 9/2016 |
| EP | 0147833 | 7/1985 |
| EP | 0212490 | 3/1987 |
| EP | 0223517 | 5/1987 |
| EP | 0225392 | 6/1987 |
| EP | 0466271 A1 | 1/1992 |
| EP | 0484998 | 5/1992 |
| EP | 0495699 | 7/1992 |
| EP | 0653899 | 5/1995 |
| EP | 0730946 | 9/1996 |
| EP | 0796718 | 9/1997 |
| EP | 0819607 | 1/1998 |
| EP | 0950608 | 10/1999 |
| EP | 0798216 | 11/2000 |
| EP | 1066951 | 1/2001 |
| EP | 1107358 | 6/2001 |
| EP | 1125844 | 8/2001 |
| EP | 0706945 | 10/2001 |
| EP | 1231149 | 8/2002 |
| EP | 1234771 | 8/2002 |
| EP | 1241098 | 9/2002 |
| EP | 1270182 | 1/2003 |
| EP | 1300340 | 4/2003 |
| EP | 1334911 | 8/2003 |
| EP | 1535843 | 6/2005 |
| EP | 1541641 | 6/2005 |
| EP | 3053834 | 8/2005 |
| EP | 1413520 | 8/2006 |
| EP | 1790572 | 5/2007 |
| EP | 2008795 | 12/2008 |
| EP | 2026630 | 2/2009 |
| EP | 2236270 | 10/2010 |
| EP | 2343242 | 7/2011 |
| EP | 2468480 | 6/2012 |
| EP | 20695816 | 2/2014 |
| EP | 2781325 | 9/2014 |
| EP | 3000584 | 3/2016 |
| EP | 2448829 | 6/2016 |
| EP | 3241667 | 11/2017 |
| EP | 3254979 | 12/2017 |
| EP | 3261932 | 12/2018 |
| EP | 3303151 | 7/2019 |
| FR | 1433873 A | 4/1966 |
| FR | 2073137 | 9/1971 |
| FR | 2776616 | 10/1999 |
| GB | 789981 | 7/2011 |
| GB | 2506681 | 4/2014 |
| IN | 10126DN2014 | 8/2014 |
| JP | S57148619 | 9/1982 |
| JP | S 63-23900 B | 5/1988 |
| JP | S63-187591 | 8/1988 |
| JP | S63-258729 | 10/1988 |
| JP | H04-6025 A | 1/1992 |
| JP | H 04-72141 A | 3/1992 |
| JP | H04-154564 | 5/1992 |
| JP | H08-244728 | 9/1996 |
| JP | H09-077006 | 3/1997 |
| JP | H10-321361 | 12/1998 |
| JP | H11-43115 | 2/1999 |
| JP | H11-514319 | 12/1999 |
| JP | 2000-127198 | 5/2000 |
| JP | 2002-046703 A | 2/2002 |
| JP | 2004-228043 | 8/2004 |
| JP | 2009-149365 | 7/2009 |
| JP | 2009-012354 | 11/2009 |
| JP | 2015-16894 A | 1/2015 |
| RU | 2096280 C1 | 11/1997 |
| RU | 1413026 A1 | 7/1998 |
| SE | 434240 | 7/1984 |
| SU | 1551588 A1 | 3/1990 |
| WO | WO 1992/015182 | 9/1992 |
| WO | WO 1997/14547 | 4/1997 |
| WO | WO 1999/029574 | 6/1999 |
| WO | WO 2001/085827 | 11/2001 |
| WO | WO 2003/053626 | 7/2003 |
| WO | WO 2003/097332 | 11/2003 |
| WO | WO 2005/004560 | 1/2005 |
| WO | WO 2005/105579 | 11/2005 |
| WO | WO 2005/110855 | 11/2005 |
| WO | WO 2007/008131 | 1/2007 |
| WO | WO 2009/139129 | 11/2009 |
| WO | WO 2010/136756 A1 | 12/2010 |
| WO | WO 2011/075055 | 6/2011 |
| WO | WO 2012/019925 | 2/2012 |
| WO | WO 2013/045254 | 4/2013 |
| WO | WO 2014/072477 | 5/2014 |
| WO | WO 2014/166765 | 10/2014 |
| WO | WO 2015/036222 | 3/2015 |
| WO | WO 2015/040173 | 3/2015 |
| WO | WO 2015/158502 | 10/2015 |
| WO | WO 2016/052689 | 4/2016 |
| WO | WO 2016/083212 | 6/2016 |
| WO | WO 2016/132986 | 8/2016 |
| WO | WO 2017/089186 | 6/2017 |
| WO | WO 2017/089187 | 6/2017 |

OTHER PUBLICATIONS

Extended European Search Report issued in European Patent Application No. 17173429.6 dated Dec. 4, 2017, in 8 pages.
Communication Under Rule 71(3) in European Application 19177036.1, dated Sep. 11, 2020, in 6 pages.
Davis, J.R, "Practical Design Guidelines for Surface Engineering" Chapter 8, Surface Engineering for Corrosion and I/Vear Resistance, ASM International, Mar. 2001; eISBN: 9781615030729, pISBN: 9780871707000; pp. 195-229.
International Search Report and Written Opinion for Application No. PCT/EP2015/056329, dated Sep. 5, 2014.
International Search Report for Application No. PCT/EP2016/077779 dated Feb. 27, 2017.
International Search Report and Written Opinion received in International Application No. PCT/EP2018/070595, dated Sep. 21, 2018, in 10 pages.
Leschynsky et al "Layered Alloys for Effective Magnetic Flux Concentration in Induction Heating," Materials Science—Poland, vol. 25, No. 2, 2007.

* cited by examiner

APPARATUS FOR SEALING THE TOP OF A PACKAGE FOR A FOOD PRODUCT AND SYSTEM FOR FORMING AND FILLING A FOOD PACKAGE

CROSS-REFERENCE TO RELATED APPLICATIONS

This application is the U.S. National Phase under 35 U.S.C. § 371 of International Application PCT/EP2018/064106, filed May 29, 2018, which claims priority to EP Application No. 17173429.6, filed May 30, 2017, the entire contents of each of which are incorporated by reference herein and made a part of this specification.

TECHNICAL FIELD

The present solution relates to an apparatus for sealing a package suitable for containing a food product. More particularly the solution relates to an apparatus for sealing the top of a food-containing package having a gable top. The solution also relates to a system for forming and filling a food package comprising the apparatus.

BACKGROUND

Packaging containers for food products are well known. These containers often have four vertical side walls (generally rectangular panels) that are closed by a gable-shaped top. A typical gable top has two equal sized gable panels that are joined by a sealed top fin. One gable panel may include a closure such as a spout with a threaded cap mounted to the gable panel to facilitate access to the contents within the container. The bottom of the container is first formed from a blank packaging material prior to filling of the container with a food product. The gable top panels are then formed and the fin is sealed.

U.S. Pat. No. 6,430,899 B1 discloses a top sealing and creasing apparatus for a gable top carton. The apparatus has a pair of opposing anvils for engaging and compressing the top fin of the carton together in order to seal the carton. Each anvil also has one or more wedges for shaping and forming distinct creases on the top gable panels.

U.S. Pat. No. 7,509,791 B2 discloses a top sealer for a gable top package having a sealed top fin. The sealer includes an arm support and a pair of opposing arms pivotally mounted to the arm support. The arms each have a sealing jaw at about an end thereof. The arms are pivotal to move the sealing jaws toward and away from one another through an arc. The arm support is linearly movable toward and away from the package, as the arms pivot, to move the sealing jaws downward, toward the package, to alter the arc of the pivoting sealing jaws.

However, existing sealing mechanisms of gable top packages do not provide effective sealing of the fin due to (i) irregularities in the package positioning that occur during feeding of the package to the sealing mechanism and/or (ii) variation in the packaging material specifications e.g. sleeve width and creasing tolerances. In turn this leads to increased bulging of the sealed package and premature leakage/spoilage of the food product within the package.

Thus there is a need for an improved sealing apparatus for a gable top package that is able to correct or at least tolerate variations in packaging positioning and packaging material specifications whilst effectively sealing the top of the package.

SUMMARY

According to a first aspect, there is provided an apparatus for sealing the top of a package for a food product, the apparatus comprising:

a pair of oppositely disposed first and second sealing jaws configured for reversibly engaging each other over the top of the package;

at least one wedge on the first sealing jaw configured for contacting a first top portion of the package to form a first gable panel;

a key on the second sealing jaw configured for contacting a second top portion of the package to form a second gable panel;

at least one lug on the key configured for reducing skewing of the package prior to sealing; and a rubber dolly on either the first or the second sealing jaw, the rubber dolly and the sealing jaw opposing the dolly being configured to form and seal a fin between the rubber dolly and the opposing sealing jaw thereby sealing the top of the package.

According to a second aspect, there is provided a system for forming, filling, and sealing a package containing a food product, the system comprising:

a bottom forming and sealing station for folding a packaging material blank into a package and sealing the bottom of the package;

a filling station for filling the package with the food product; and an apparatus according to the first aspect for sealing the top of the package.

BRIEF DESCRIPTION OF DRAWINGS

Some preferred, non-limiting embodiments of the present solution will be described by way of example with reference to the accompanying drawings, in which.

DETAILED DESCRIPTION

An apparatus and system according to an embodiment is described below with reference to FIGS. 1-7.

Figure 1A:
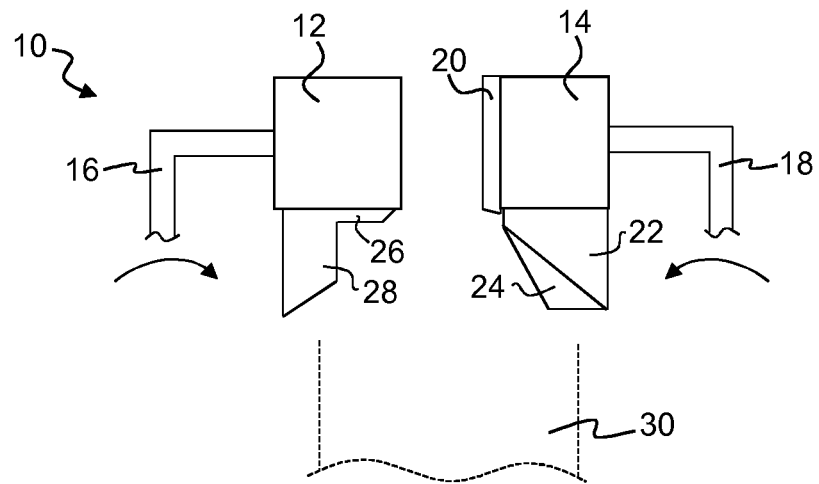
FIG. 1A illustrates an apparatus for sealing the top of a package for a food product according to an embodiment with the sealing jaws spaced apart from one another prior to sealing the package.
Figure 1B:
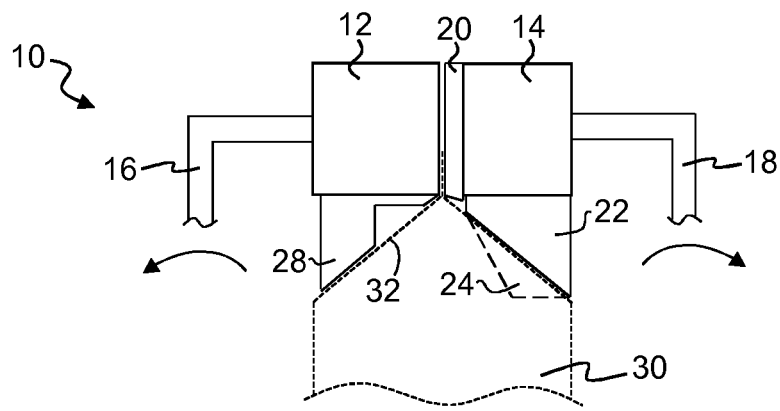
FIG. 1B depicts the apparatus of FIG. 1A with the sealing jaws engaged with one another about the top fin of a package to seal the package.
Figure 1C:
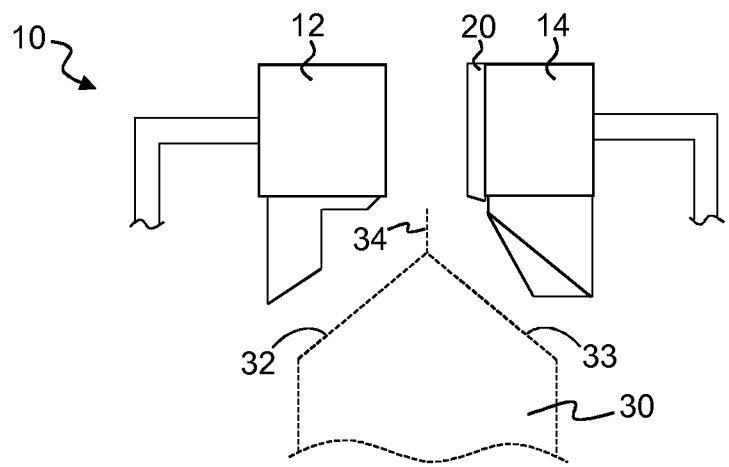
FIG. 1C shows the apparatus in FIG. 1A after sealing the package.
Figure 2:
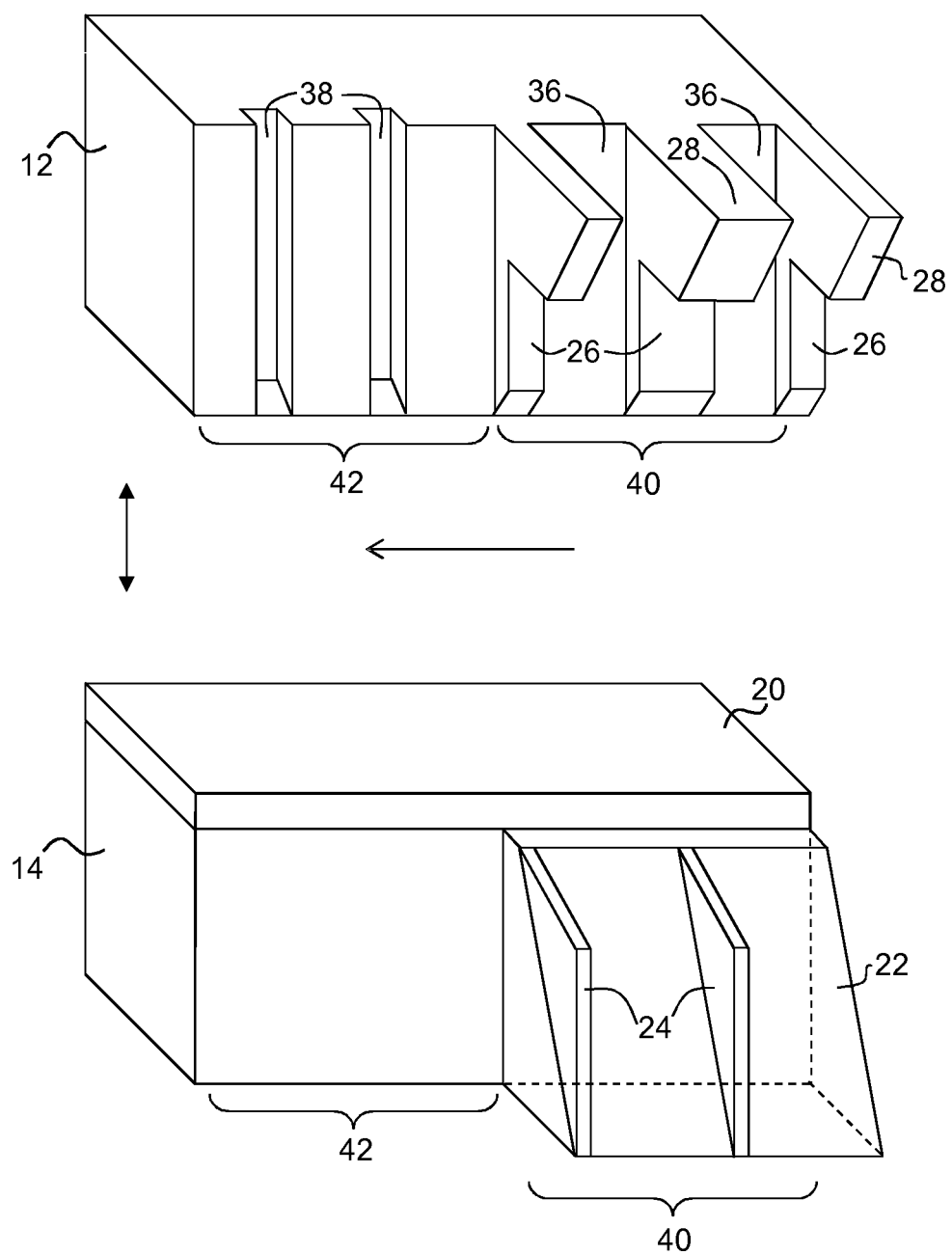
FIG. 2 is a perspective view of the sealing jaws in the apparatus of FIGS. 1A-1C.

FIGS. 1A-1C illustrate an apparatus 10 for sealing the top of a package 30 suitable for a food product. Apparatus 10 has a pair of oppositely disposed sealing jaws 12 and 14 located at the end of arms 16 and 18. The sealing jaws may be heated to facilitate sealing. The arms 16, 18 are connected to a drive mechanism (not shown) at their other end such that in use the arms 16, 18 alternately bring the jaws 12, 14 towards each other in the direction of the curved arrows in FIG. 1A then pull the jaws 12, 14 away from each other in the direction of the curved arrows in FIG. 1B. Any particular drive mechanism may be utilised such as hydraulic, pneumatic, electromechanical, and electrical drive mechanisms. The bottoms of jaws 12 and 14 are illustrated in more detail in FIG. 2. Both jaws 12, 14 have a sealing portion 40 and a cooling portion 42. Each portion 40 and 42 is able to accommodate two packages at a given time. Jaw 12 has three wedges 26 on the bottom surface of jaw 12 in the sealing portion 40. Each wedge 26 has a projection 28 extending downwardly away from the wedge 26 and jaw 12. Each wedge 26 and its projection 28 are spaced apart from another wedge/projection by gaps 36 which accommodate a closure such as a spout (not shown) on the package 30 during the sealing stage. The other jaw 14 has a key 22 on the bottom surface of jaw 14 in the sealing portion 40. Two lugs 24 extend downwardly away from key 22 and jaw 14. The cooling portion 42 of jaw 12 has a pair of recesses 38 for supplying cooling air to the sealed package 30 and/or allowing residual heat to escape the apparatus 10. The heat may be generated while the package is in the sealing portion 40. A dolly 20 is present on the side sealing surface of jaw 14 that engages jaw 12 during use. Dolly 20 is preferably made of rubber. The apparatus 10 as shown in FIG. 1A is located above the unsealed top portion of a package 30. The bottom portion of the package 30 is omitted for clarity. The double headed arrow in FIG. 2 depicts the alternating movement of jaws 12, 14 relative to each other during use. The single headed arrow in FIG. 2 depicts the direction of travel of the package 30 through the apparatus 10 as will be described below.

The apparatus 10 operates as follows. A package 30 with an unsealed top portion is fed to a position underneath the sealing portion 40 of the apparatus 10 as shown in FIGS. 1A and 2. The drive mechanism activates arms 16, 18 to move jaws 12 and 14 towards each other in the direction of the curved arrows. As the jaws 12, 14 come closer to engaging, projection 28 contacts the package 30 to fold and form a top portion of the package 30 into gable panel 32. Wedge 26 also contacts the package 30 away from projection 28 at a portion that is closer to the top of the package 30. Key 22 contacts another top portion of package 30 to fold and form an opposing gable panel 33. Lug 24 only contacts the package 30 when the package 30 has an irregular conformation as will be described further below with regard to FIGS. 6A-6C. Otherwise, lug 24 passes adjacent to the package 30 to the position shown by the dashed line depicting lug 24 in FIG. 1B. Dolly 20 and jaw 12 contact and compress the top most portion of the package 30 to form and seal fin 34 between the dolly 20 and jaw 12 as best shown in FIG. 1B. Once the gable panels 32, 33 and fin 34 are formed and sealed, the arms 16, 18 are moved in the direction of the curved arrows shown in FIG. 1B to separate the jaws 12, 14 and release the sealed package 30 shown in FIG. 1C. The sealed package 30 is then moved to the cooling portion 42 by a conveyor belt or other transportation system (not shown). When the sealed package 30 is underneath the cooling portion 40 the drive mechanism again moves jaws 12, 14 back into engagement around fin 34. This reinforces the seal that was formed in the sealing portion 40. Residual heat escapes through recesses 38 of jaw 12. Alternatively, cooling gas or cooling air may be supplied to the sealed package 30 via recesses 38. Jaws 12, 14 are then separated and the transportation system moves the sealed and cooled package 30 out of the apparatus 10.

Figure 3A:
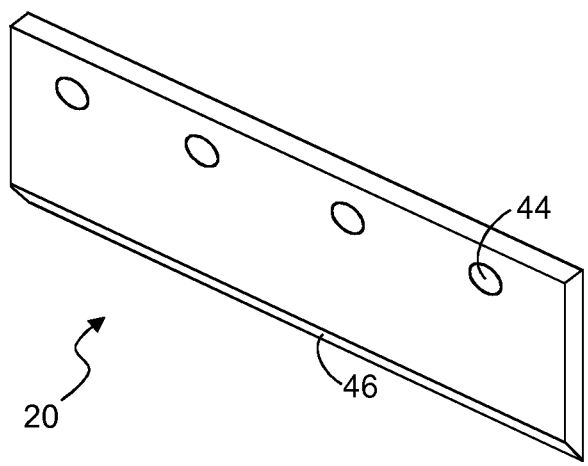
FIG. 3A is a perspective view of the dolly that is attached to a sealing jaw in FIGS. 1A-C and FIG. 2.
Figures 3B, 3C:
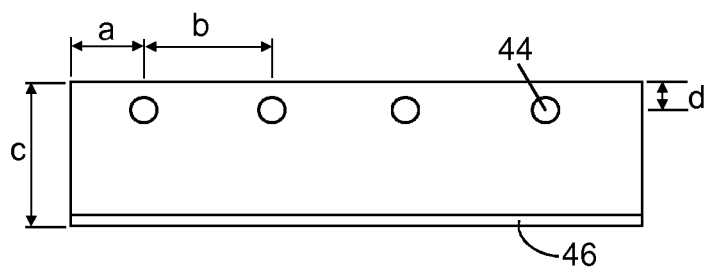
FIG. 3B is a side view of the dolly in FIG. 3A.
FIG. 3C is a front view of the dolly in FIG. 3A.
Figure 3D:
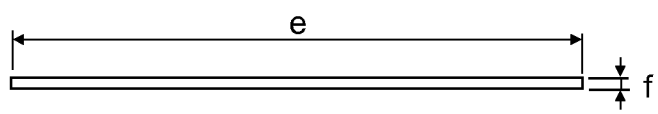
FIG. 3D is a top view of the dolly in FIG. 3A.
Figure 4:
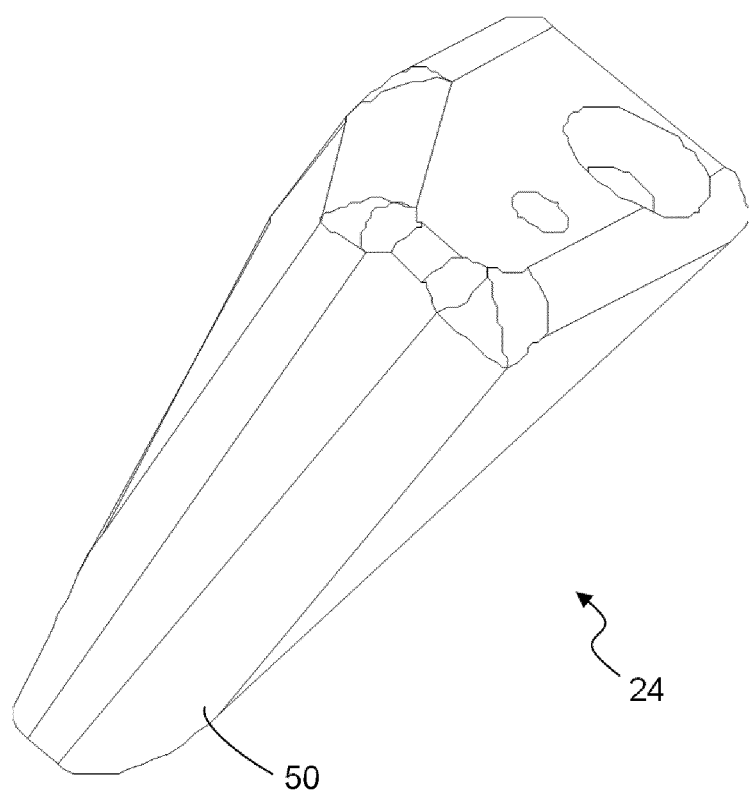
FIG. 4 is a perspective view of the lug that is on the sealing jaw in FIGS. 1A-C and FIG. 2.

FIGS. 3A-3D illustrate a dolly 20 that may be attached to sealing jaw 14. Dolly 20 has four holes 44 for securing the dolly 20 to the jaw 14 using screws or other suitable fastening elements. A bevelled surface 46 at the bottom of dolly 20 rests against the gable panel 33 adjacent to fin 34 of package 30. Bevelled surface 46 helps to form fin 34 and provide an opposing balancing force to the force applied by wedge 26 to package 30. Non-limiting, exemplary dimensions of dolly 20 as shown in FIGS. 3B-3D are:

a: 37 mm
b: 90 mm
c: 50 mm
d: 12 mm
e: 344 mm
f: 4 mm
θ: 25°
diameter of holes 44: 5.5 mm FIG. 4 depicts an exemplary lug 24 that is attached to key 22 of sealing jaw 14. Lug 24 has a chamfered surface 50 for assisting with correcting irregular package conformations prior to sealing as described below with respect to FIGS. 6A-6C.

Figure 5:
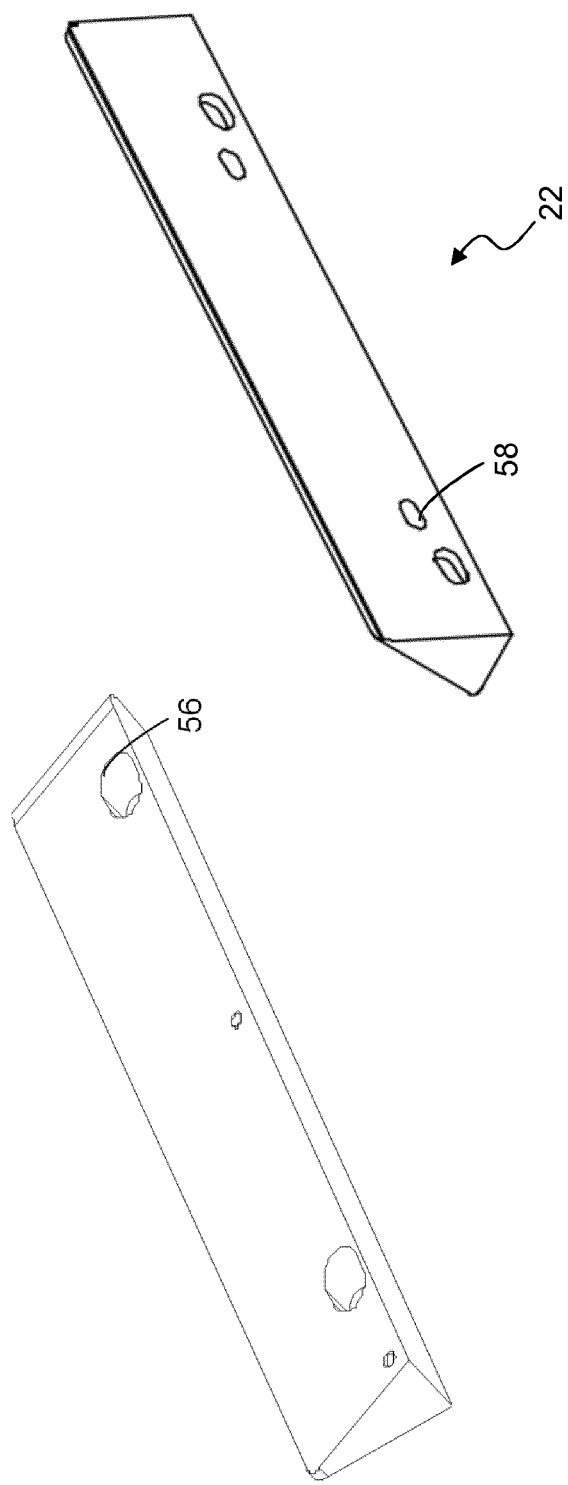
FIG. 5 shows front and rear perspective views of the key that is on the sealing jaw in FIGS. 1A-C and FIG. 2.

FIG. 5 illustrates a key 22 that is on the sealing jaw 14. Key 22 is manufactured in one piece from any suitable material such as metal. Holes 56 and 58 are provided for securing the key 22 to the jaw 14 and the lug 24 to the key 22 using screws or similar fastening elements. The longitudinal length of key 22 spans the length of the sealing portion 40.

Figure 6A:
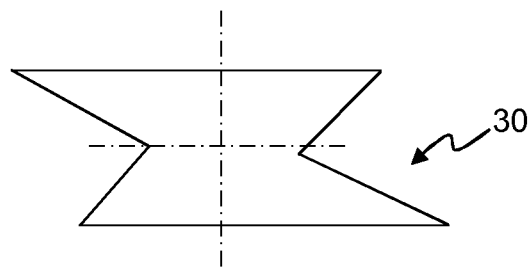
FIG. 6A is a top view of a package with an irregular conformation prior to sealing with the apparatus of FIGS. 1A-1C.
Figure 6B:
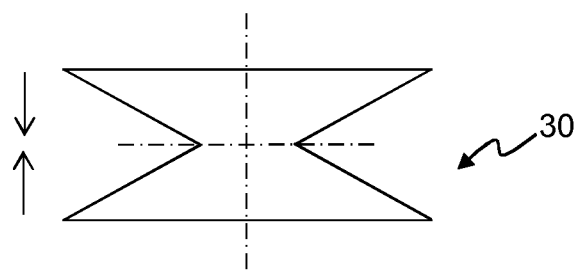
FIG. 6B is a top view of the package in FIG. 6A after contact with a lug on the sealing jaw in the apparatus of FIGS. 1A-1C but prior to sealing of the fin.
Figure 6C:
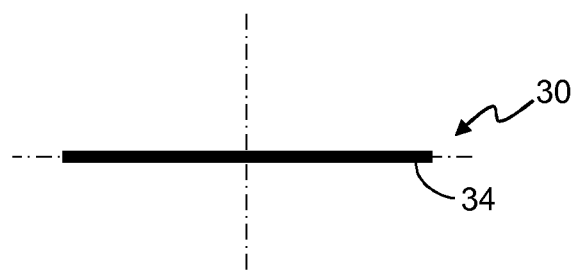
FIG. 6C is a top view of the package in FIG. 6B after formation and sealing of the fin with the sealing jaws of the apparatus of FIGS. 1A-1C.

FIG. 6A shows a top view of a package 30 with a skewed conformation prior to entering the sealing portion 40 of apparatus 10. A package 30 may become skewed during forming of the bottom portion, filling with the food product, or transport of the package to the apparatus 10. If the skewed conformation is not corrected before sealing the top of the package then an unsymmetrical fin 34 will be formed between sealing jaws 12, 14. This creates a displeasing appearance and may compromise the efficiency of the seal that is formed. The sealed package may also display increased bulging. As the sealing jaws 12, 14 move towards each other during the sealing process, chamfered surface 50 of lug 24 contacts the skewed vertical edges of package 30 and corrects the conformation of the package 30 to one that is highly symmetrical about its horizontal axes (shown by dashed-dotted lines) when viewed from above as shown in FIG. 6B. The sealing jaws 12, 14 then continue to move towards each other in the directions shown by the arrows in FIG. 6B to form the fin 34 and seal the top of the package 30 as shown in FIG. 6C.

Figure 7:
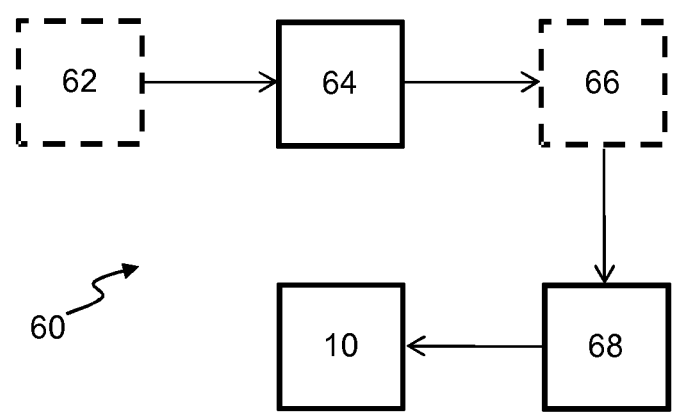
FIG. 7 illustrates a system for forming and filling a package for a food product comprising the apparatus of FIGS. 1A-1C.

FIG. 7 shows a system 60 for forming, filling, and sealing a package containing a food product. System 60 may have a package magazine 62 for storing flat packaging material blanks, if desired. During operation of system 60, the packaging material blanks are fed from magazine 62 (or other source) to a bottom forming and sealing station 64 where the blanks are folded and the bottom portion of the package is formed and sealed. The partially formed package is then fed to a sterilisation station 66 where the package is sterilised with hydrogen peroxide solution and/or UV light. However, it is not essential to include a sterilisation station 66 in system 60. The package is fed from the sterilisation station 66 (or bottom forming and sealing station 64) to a filling station 68 for filling of the package with a food product. Finally, the package containing a food product is transported to sealing apparatus 10 for sealing the top of the package as described above with respect to FIGS. 1A-1C and 2.

Use of the lug 24 facilitates correction of skewed package conformations prior to sealing thereby resulting in reduced package bulging and more efficient top sealing. Use of the rubber dolly 20 on one of the sealing jaws (instead of simply a stainless steel jaw surface with state marks) allows for formation of an efficient seal between the two jaws regardless of irregularities in the package positioning that may occur during transport of the unsealed package to the apparatus 10. The rubber dolly 20 is also able to efficiently seal the package despite variation in package specifications such as sleeve width and creasing tolerances.

LIST OF REFERENCE NUMERALS

The following table lists the features and their respective reference numerals of the apparatus and system.

| Feature | Reference Numeral |
| --- | --- |
| Apparatus | 10 |
| Sealing jaws | 12, 14 |
| Arms | 16, 18 |
| Dolly | 20 |
| Key | 22 |
| Lug | 24 |
| Wedges | 26 |
| Projections | 28 |
| Package | 30 |
| Gable panels | 32, 33 |
| Fin | 34 |
| Gaps | 36 |
| Recesses | 38 |
| Sealing portion | 40 |
| Cooling portion | 42 |
| Dolly holes | 44 |
| Bevelled surface | 46 |
| Chamfered surface | 50 |
| Key holes | 56, 58 |
| System | 60 |
| Package magazine | 62 |
| Bottom forming and sealing station | 64 |
| Sterilisation station | 66 |
| Filling station | 68 |

What is claimed is:

1. An apparatus for sealing the top of a package for a food product, the apparatus comprising:
   a pair of oppositely disposed first and second sealing jaws configured for reversibly engaging each other over the top of the package;
   at least one wedge on the first sealing jaw configured for contacting a first top portion of the package to form a first gable panel;
   a key on the second sealing jaw configured for contacting a second top portion of the package to form a second gable panel;
   at least one lug on the key configured for reducing skewing of the package prior to sealing, the at least one lug having a length extending away from the key greater than a width of the at least one lug along the key, wherein the at least one lug contacts the package only when the package has an irregular conformation; and
   a rubber dolly on either the first or the second sealing jaw, the rubber dolly and the sealing jaw opposing the rubber dolly being configured to form and seal a fin between the rubber dolly and the opposing sealing jaw thereby sealing the top of the package.

2. The apparatus of claim 1, wherein the rubber dolly is on the second sealing jaw.

3. The apparatus of claim 1, wherein the rubber dolly has a bevelled surface configured for contacting the first or second gable panel.

4. The apparatus of claim 1, wherein the rubber dolly is between 2 mm and 6 mm thick.

5. The apparatus of claim 1, wherein the rubber dolly has a plurality of holes for receiving a fastening element for securing the rubber dolly to the sealing jaw.

6. The apparatus of claim 1, comprising at least two lugs on the key.

7. The apparatus of claim 1, wherein the lug or lugs has at least one chamfered surface.

8. The apparatus of claim 1, further comprising at least three wedges, each wedge having a projection configured for contacting a third top portion of the package.

9. The apparatus of claim 8, further comprising a gap between at least two of the wedges, the gap being configured for housing a closure on the package.

10. The apparatus of claim 1, wherein the first and second sealing jaws further comprise a cooling portion configured for receiving the sealed package.

11. The apparatus of claim 1, further comprising a pair of arms, each arm being connected to one of the first and second sealing jaws and being configured for reversibly engaging the sealing jaws with each other.

12. A system for forming, filling, and sealing a package containing a food product, the system comprising:
   a bottom forming and sealing station for folding a packaging material blank into a package and sealing the bottom of the package;
   a filling station for filling the package with the food product; and
   the apparatus according to claim 1 for sealing the top of the package.

13. The system according to claim 12, further comprising a package magazine for storing the packaging material blank.

14. The system according to claim 12, further comprising a sterilisation station for sterilising the package prior to filling the package with the food product.

15. The apparatus of claim 1, wherein the width of the at least one lug along the key is less than half of a width of the key, the width of the at least one lug along the key parallel to the width of the key.

16. The apparatus of claim 1, wherein the at least one lug has a depth extending along the key greater than half of a depth the key, the depth of the at least one lug perpendicular to the length of the at least one lug, and the depth of the at least one lug parallel to the depth of the key.

17. The apparatus of claim 1, wherein the at least one lug comprises at least two lugs on the key, the at least two lugs separated by a distance along the key, the distance less than a width of the key parallel to the width of the at least one lug.

* * * * *